(12) United States Patent
Bushman et al.

(10) Patent No.: US 7,552,538 B1
(45) Date of Patent: Jun. 30, 2009

(54) HOOF BALANCER AND LIMB ALIGNMENT TOOL

(76) Inventors: Phillip Carleton Bushman, P.O. Box 1458, Winchester, VA (US) 22604; James L. Brady, 1268 Frog Hollow Rd., Winchester, VA (US) 22603

( * ) Notice: Subject to any disclaimer, the term of this patent is extended or adjusted under 35 U.S.C. 154(b) by 0 days.

(21) Appl. No.: 11/970,506

(22) Filed: Jan. 7, 2008

(51) Int. Cl.
*A01L 11/00* (2006.01)
(52) U.S. Cl. .............................. 33/195; 33/511; 168/45; 168/48.1
(58) Field of Classification Search ................... 33/195, 33/511; 168/45, 48.1
See application file for complete search history.

(56) References Cited

U.S. PATENT DOCUMENTS

| | | | | |
|---|---|---|---|---|
| 82,214 | A * | 9/1868 | Ferren | 33/195 |
| 583,706 | A * | 6/1897 | Kearns et al. | 33/195 |
| 619,361 | A | 2/1899 | Stephens | |
| 832,060 | A * | 10/1906 | Holmquist | 33/195 |
| 893,592 | A * | 7/1908 | McGowen | 168/48.1 |
| 1,116,326 | A | 11/1914 | Powlowski et al. | |
| 1,202,348 | A * | 10/1916 | Yates | 33/195 |
| 3,494,044 | A * | 2/1970 | Sayers | 33/195 |
| 3,682,179 | A | 8/1972 | Firth et al. | |
| 4,214,370 | A * | 7/1980 | Beaston | 33/195 |
| 4,813,148 | A | 3/1989 | Finnegan | |
| 5,027,520 | A | 7/1991 | Finnegan | |
| 6,360,824 | B1 * | 3/2002 | Singley | 168/45 |
| 6,502,642 | B2 * | 1/2003 | Ahrens | 168/45 |
| 6,817,110 | B2 * | 11/2004 | Bohnengel | 33/555.4 |
| 6,907,670 | B1 * | 6/2005 | Teed | 33/195 |
| 7,013,981 | B2 * | 3/2006 | Goode | 168/45 |
| 7,165,623 | B2 * | 1/2007 | Healey | 168/45 |
| 2003/0167739 | A1 | 9/2003 | Clark et al. | |
| 2007/0033909 | A1 | 2/2007 | Lustgarten | |

FOREIGN PATENT DOCUMENTS

| | | |
|---|---|---|
| DE | 19826099 A1 | 11/1998 |
| DE | 202005004464 A1 | 6/2005 |
| DE | 102005015183 | 10/2006 |
| EP | 0860115 A1 | 8/1998 |
| GB | 1463211 A1 | 2/1977 |
| GB | 2432293 A1 | 5/2007 |
| JP | 4-027324 A1 | 1/1992 |
| JP | 8-214572 A1 | 8/1996 |
| WO | WO03015509 A1 | 2/2003 |
| WO | WO2004017729 A1 | 3/2004 |

* cited by examiner

*Primary Examiner*—Christopher W Fulton (57) ABSTRACT

The present invention is a visual aid for balancing and aligning the equine hoof. Unlike previous devices that consider only the ground surface when balancing the hoof capsule, this invention utilizes coronet band and hoof capsule deformation as the start point for rebalancing giving it a top down approach. This wrap-around device is superimposed upon a live hoof capsule for measurement and visualization. The invention is flexible, resilient, and adjustable allowing for proper placement and utilization on all equine hooves. A posterior attaching mechanism may be incorporated into the device for added stability. On the surface of the device are various markings with which measurements are made.

19 Claims, 11 Drawing Sheets

HOOF BALANCER AND LIMB ALIGNMENT TOOL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of Invention

The present invention relates to a farrier's tool. More specifically, but not by way of limitation, this invention is for use by farriers and horse owners to assess the balance of the equine hoof and the alignment of the hoof with the adjoining limb. This invention is a guidance tool that teaches and demonstrates proper hoof balance and alignment. It provides a mechanism whereby horse owners and farriers can care for their horses better and more effectively by providing a unique top/down assessment technique for balancing and aligning the hoof capsule. Additionally, this invention will help both the farrier and horse owner to evaluate the work being done and the effects of changes that are made to the hoof capsule in order to correct pre-existing imbalances and hoof-to-limb misalignments.

The following patents granted appear to be related to the current invention but do not specifically apply or cannot be utilized in the manner in which the current invention is used:

U.S. Pat. No. 4,214,370 (Beaston) discloses a hoof alignment tool capable of wrapping around a hoof for measuring, see FIG. 3.

U.S. Pat. No. 7,165,623 (Healey) discloses a general farrier's measuring tool for determining a break-over point and preparing a hoof for shoeing, see column 1, lines 7-24.

The following documents appear to disclose structures that involve a wraparound feature for use on a hoof (not necessarily a horse), however none of these documents appear to disclose any use or involvement of estimating hoof alignment or related hoof geometrical measurements.

DE202005004464 (Drucker) discloses a wraparound structure for use on a hoof, see the front page drawing.

USPA 2007/0033909 (Lustgarten) discloses a custom made boot and shoe for hoofs in which a plastic material is heated to softening, thereby allowing it to be wrapped around the hoof; see FIGS. 3 and 8A/B for "split-ring" type structure. Also see USPA 2003/0167739 (Clark et al.).

WO2004/017729 (Nolan) discloses farrier's shoeing appliance, including a partial wraparound structure which is attached to the hoof, see front page figure.

EP860115 (Lieby) discloses a device to protect the hoof of a horse including a wraparound structure, see FIG. 7. Also, see GB2432293 (Pickering).

GB1463211 (Ensinozo) discloses a hoof protector that wraps around the hoof, see FIG. 1.

The remaining cited documents show various hoof attached devices that could be usable in aligning a hoof or determining misalignment, but which appear to be silent regarding disclosure of actually applying of this feature.

List of Uncovered Documents

US Patents:

| U.S. Pat. No. | Issue Date (M/D/Y) | Inventor | Assignee |
|---|---|---|---|
| 7,065,623 | 01/23/2007 | Healey | n/a |
| 4,214,370 | 07/29/1980 | Beaston | n/a |
| 3,682,179 | 08/08/1972 | Firth et al | n/a |
| 1,116,326 | 11/03/1914 | Powlowski et al | n/a |
| 619,361 | 02/14/1899 | Stephens | n/a |

US Patent Application Publications:

| Publication No. | Issue date (M/D/Y) | Inventor | Assignee |
|---|---|---|---|
| 20070033909 | 02/15/2007 | Lustgarten | n/a |
| 20030167739 | 09/11/2003 | Clark et al. | n/a |

Foreign Patents:

| Document number | Publication date (M/D/Y) | Inventor | Applicant |
|---|---|---|---|
| WO2004/017729 | 03/04/2004 | Nolan | Nolan |
| WO03015509 | 02/27/2003 | Mustad | Mustad et al |
| EP0860115 | 08/26/1998 | Lieby | Lieby |
| GB2432293 | 05/23/2007 | Pickering | Pickering |
| GB1463211 | 02/02/1977 | Ensinozo | Ensinozo |
| DE102005015183 | 10/05/2006 | Hoffmann | Hoffmann |
| DE202005004464 | 06/30/2005 | Drucker | |
| DE19826099 | 11/19/1998 | Brosig | Brosig |
| JP8-214752 | 08/27/1996 | Sano | Naru Toreidengu |
| JP4-027324 | 01/30/1992 | Narahara | Narahara |

2. Prior Art

The equine hoof is a complex structure. Internally, it is composed of a bony column including digital phalanges and distal sesamoid bones, tendons and ligaments, and an extensive nail bed that is profoundly vascular. External structures include the area of joinder between skin and horny outer shell, the coronet band, the horny material that is the hoof proper, and a ground surface which includes the sole, the frog, and the bulbs of the foot.

While one might easily think of the hoof as a wooden, static structure, which once grown does not change. The hoof is, in fact, plastic and fluid in its response to impact pressure. Functionally, the equine foot in conjunction with the adjoining limb must at any given moment absorb tremendous concussion as the horse moves about. In order to effectively absorb many tons of impact pressure, the hoof structures must be both supple, which attenuates the impact of concussion, and fluid, which attenuates the hard slap of footfall against a hard surface. One might think of the equine foot as hydraulic in nature.

The hoof capsule deforms each time it accepts the load of movement. This deformation is one of expansion and contraction, made possible by the broken circle of the hoof capsule, the fluidic nature of the internal structures, and the suppleness of the column of bone and ligament within the foot. Once the impact wave has dissipated, the hoof capsule rebounds to its original shape and the bony column regains its resting posture. The foot is ready once again to absorb the next impact. In this way the equine foot and leg act as living shock absorbers.

Clearly, the unprotected equine hoof will wear and degrade with activities of daily life. Nature has provided for this eventuality by constantly replenishing the horny material that is being worn away or degraded. Like the human fingernail, the hoof capsule, the container for all internal structures, originates from a keratogenous membrane. This horn-producing substrate replenishes the hoof throughout the horse's life. In the wild, hoof growth commonly equals the rate of degradation and wear caused by daily foraging and self-preservation. In captivity, given the increased stress of riding the horse, the degradation of the hoof capsule is often greater than the rate at which it can be replenished by the nail bed. For this reason, the horseshoe was invented.

Once affixed to the hoof, the horseshoe effectively stops all degradation of the horny hoof. Absent degradation, some artificial treatment of the hoof is required to maintain the structure's integrity and functionality. Most often, a farrier is summoned to trim the excess growth and reapply the protective shoe. In shoeing the horse, the farrier must make choices about how best to attain the optimal shape, length, and angle of the hoof.

There is universal agreement in the horse community that some combination of angles, distances, thicknesses, or other measures of the hoof affect the motion, comfort, and soundness of the horse. Historically, farriers, veterinarians, and horsemen have discussed and promoted techniques for trimming and shoeing the horse that they believed to be the best ways to preserve its comfort and soundness. Yet, as evident from the ongoing debate, the practice and theory of the proper trim and balance of the equine hoof has remained a point on which there is no consensus.

However, one theorem is certain: In order to change the balance and alignment of the equine foot and limb, one must change the way the hoof strikes the ground. This is accomplished by leaving or removing portions of the ground surface of the hoof capsule.

The farrier's responsibility is to interpret the equine foot and determine how much material should be removed from a particular aspect of the hoof capsule in order to assure the most beneficial balance for the horse. The hoof capsule, however, because it is constantly growing, is constantly changing. As the hoof capsule changes, the distribution of impact forces through the equine foot and limb also changes. Correctly removing portions of the ground surface of the hoof capsule allows the hoof to address the ground in a way that benefits and preserves the horse's comfort and soundness.

Traditional understanding teaches that one must evaluate the balance of the hoof capsule at the instant of touchdown at the end of stride. If the hoof capsule meets the horizontal plane flat, with the possible exception that the heels might strike the surface slightly before the rest of the foot, it is considered to be balanced. Conversely, if one side of the hoof capsule touches slightly ahead of the other, it is imbalanced. The side of the hoof capsule that touches first must be reduced only enough to allow the hoof to again contact the horizontal plane flat. The question then becomes, how much is enough? Given this traditional viewpoint, one can easily understand why farriers have focused almost exclusively on the bottom of the horse's foot to find its balance. This focus is further evident in past patents claiming balancing the equine hoof as inherent in the invention.

While balancing the equine hoof capsule using the instant of contact as the primary variable is logical, it is clinically impractical. Not only is instant of contact too fast to analyze by simple observation, but also there are few locations at which a horizontal surface is available on which to observe the horse in motion. Additionally, should such a surface be available, there is the additional problem of the influence of the person leading the horse on the movement of that horse.

One must look for evidence of balance that can be analyzed and studied over time. This evidence would ideally be more substantial and permanent, allowing for measurement. In fact, such evidence is found in the deformation of the equine hoof capsule. This deformation might be thought of as an average of all the forces acting on the hoof by the adjoining limb, concussion from movement, and static pressures created by the mass of the horse.

If the hoof capsule is perfectly balanced, it will not deform. A perfectly balanced hoof is a theoretical concept, like a vacuum. In reality, all hoof capsules are in some state of deformation, no matter how slight. Fortunately, the hoof capsule deforms predictably in response to known conditions of the hoof wall. Learning to correct imbalances by interpreting hoof capsule deformations takes years of practice. Even with experience, one may misinterpret the deformation and fail to correct the problem.

Horse owners must rely upon the expertise of their farriers. So long as their horses remain sound and comfortable, they must assume that the work being done on their horses is correct. They do not know their horses are getting inappropriate care until they are prematurely lame. Until and unless some method of checking the work being done by farriers is devised, this unfortunate circumstance will continue to affect a growing number of horses and their owners.

In recent history, the horseshoeing trade has suffered a breakdown in its once effective and demanding system of education, the apprenticeship system. In the past, an apprentice spent years honing and mastering his skills under the tutelage of a Master Farrier/Blacksmith. Long after the Apprentice had graduated from the ranks of apprenticeship to the coveted level of Journeyman, he was expected to continue his education with the shop Masters. Only after many years of toil would the apprentice finally rise to the rank of Master Farrier. Not until then would he have gained adequate knowledge to venture into his own shop and business. Though a worthy system, it was born of a less hectic era and although still a respected educational model, it has been largely forsaken.

To fill the void created by the breakdown of the apprenticeship system, master farriers formed Shoeing Schools. While such institutions are certainly effective in introducing the basic mechanics of shoeing, they are typically short courses and, therefore, cannot be expected to teach the fine techniques of the Art of Shoeing in the limited time available for classroom pedagogy and practical application. Because of this unhappy solution for the anachronistic Apprenticeship System, the Art of Farriery is vanishing and along with it, the reliable quality of the farriers' craftsmanship. Unfortunately, it is the horse who is most affected by this unfortunate turn of events. For it is the horse whose comfort and soundness is at risk when his therapy is the responsibility of an insufficiently experienced or educated craftsman.

BRIEF SUMMARY OF THE INVENTION

In accordance with one aspect of the present invention, there is provided a method and system for interpreting and visualizing the response of the imbalanced, misaligned equine hoof capsule to the impact forces created during movement. Further, the present invention provides a method and system whereby the hoof capsule may be balanced and properly aligned with the adjoining limb. The balance and alignment attained in the use of this invention will have the benefit of relieving the undesirable impact forces that cause hoof capsule deformation and ultimately lameness. Once relieved of these undesirable forces, the hoof capsule will return to a most beneficial symmetry which assures the harmless dissipation of concussion through the hoof and limb.

In one embodiment, there is provided a device and system for superimposing that device upon an equine hoof. The proper application of the device parallel to the coronet band assures that the balance of the hoof is uniquely assessed from the horse to the ground and not in the traditional way which looks from the ground to the horse. Stated differently, the present invention looks at balancing the horse from the top down as opposed to the traditional bottom up approach.

The device requires little instruction and ordinary psychomotor skills to operate. Once properly superimposed and affixed to the hoof, a series of markings may be made directly on the hoof. These markings will help the user of the invention to visualize how a properly balanced and aligned hoof capsule should look. In addition, the device indicates how to bring a hoof capsule into balance and alignment regardless of its current state of imbalance.

The present invention provides a method and system for obtaining a quantitative data set with which farriers and horse owners can assess and track the accuracy of the balance and alignment of their horses' hooves. The utilization of the invention, the measurements generated by its use, and the final assessments of balance and alignment are position independent. That is, the horse need not be standing on a prescribed platform or with his feet perpendicularly positioned upon a horizontal plane.

In another aspect of the present invention, there is provided a means to visualize hoof capsule deformations, based on the application of the device and the utilization of the device as a template for demarcation. The demarcations on the hoof capsule can be further utilized to indicate those portions of the ground surface of the horny hoof that must be removed to bring the hoof capsule back into proper alignment and balance with the limb.

In another aspect of the present invention there is provided a means, based on the quantification of the visual parameters indicated by the device, to compare horses. A method and system is provided for the measurement of the parameters specific to individual horses. By averaging these measurements with data collected from other horses a "normal" data set may be created. In this way, optimum balance can be assessed based on not only limb conformation but also the specific use of the horse, breed type, body type, and other variables.

In another aspect of the present invention there is provided a means, based upon visual, recordable, and quantitative measurement generated by the device, for comparing a particular horse to itself over time. In this way changes in the conformation and deformation of the hoof capsule and adjoining limb alignment and pathology can be tracked. Such history of the horse's response to the balance and alignment being achieved by the trimming technique applied allows for an assessment of such aspects of the horse as suitability of type, breed, or conformation for a particular task.

In another aspect of the present invention, there is provided a means of clarifying the best method for correcting and maintaining the balance of the equine foot, based upon conformation, work required, and intensity of work, and injury. A system and method is provided for submitting quantitative and visual data to a shared database, which will be accessible via World Wide Web.

In yet another aspect of the present invention there is provided a system for educating both the farrier and the horse owner. The present invention will serve as an educational tool. With it both farrier and horse owner will learn to recognize a properly balanced hoof capsule. By application, the types and causes of hoof capsule deformation will be clarified, allowing students to better analyze the equine limb and many of the maladies with which it is afflicted.

One embodiment of the invention may be a measuring and assessing device for use in bringing the equine hoof into correct position and balance relative to the adjoining pastern and upper limb. The device may be directly applied to the equine hoof wall, parallel to the coronet band, in the manner of a template or pattern. The device may include a flexible, malleable, and resilient material that may be more or less ovate in shape. The device may be continuous and rounded at one end, and open and discontinuous at the opposite end. The device may have a first side and an opposing second side, an upper edge and an opposing lower edge, a medial aspect, a lateral aspect, and an anterior aspect. The anterior aspect may be the continuous, rounded end, and the posterior aspect may be the opposing open end. The device may include a set of markings and measurement indices which may be indelibly inscribed on the anterior, medial, lateral, and posterior aspects of the device. The markings and measurement indices may describe dimensions and locations of anatomical structures affecting the balance and alignment of the hoof. The device may include an attaching system located in the area of the open ended, posterior portion of the device. The attaching system may join the terminal portions of the medial and lateral aspects of the device. The attaching system may reinforce the resilience of the flexible and resilient material thereby providing a means of temporarily affixing the device to the equine hoof.

The features of the invention believed to be novel are presented with particularity in the appended claims. The present invention, both as to organization and method of operation, together with further objects and advantages thereof may be best understood by reference to the following description taken in conjunction with the accompanying drawings.

BRIEF DESCRIPTION OF DRAWINGS

What follows is a brief description of the various drawings depicting the Hoof Balancer and Limb Alignment Tool.

DETAILED DESCRIPTION OF PREFERRED EMBODIMENT THE INVENTION

As will be presently described, this invention is a device for balancing the equine hoof and aligning the adjoining limb to said hoof. In one embodiment, the present invention comprises a wrap-around device which is made of a material that is transparent, flexible, and elastic. The material may be plastic, rubber, or other material displaying similar flexible and resilient characteristics. In other embodiments, the material may be either opaque or transparent so long as it retains the characteristics of malleability, flexibility, and resiliency.

The inventive device may be superimposed upon the hoof and secured by an attaching mechanism that originates in the posterior branches of the device and encircles the bulbs of the foot. The securing mechanism draws the device into close contact with the hoof wall. Once properly located and securely placed upon the hoof wall, the device is used as a template and aid for visualizing the corrections that must be made to rebalance the hoof and return it to a healthful, beneficial conformation. Various markings and indices are provided on the present invention which assure: (1) proper placement; (2) the objective measurement and assessment of the hoof capsule; and, (3) suggested patterns for properly balancing and aligning the deformed hoof.

Figure 1:
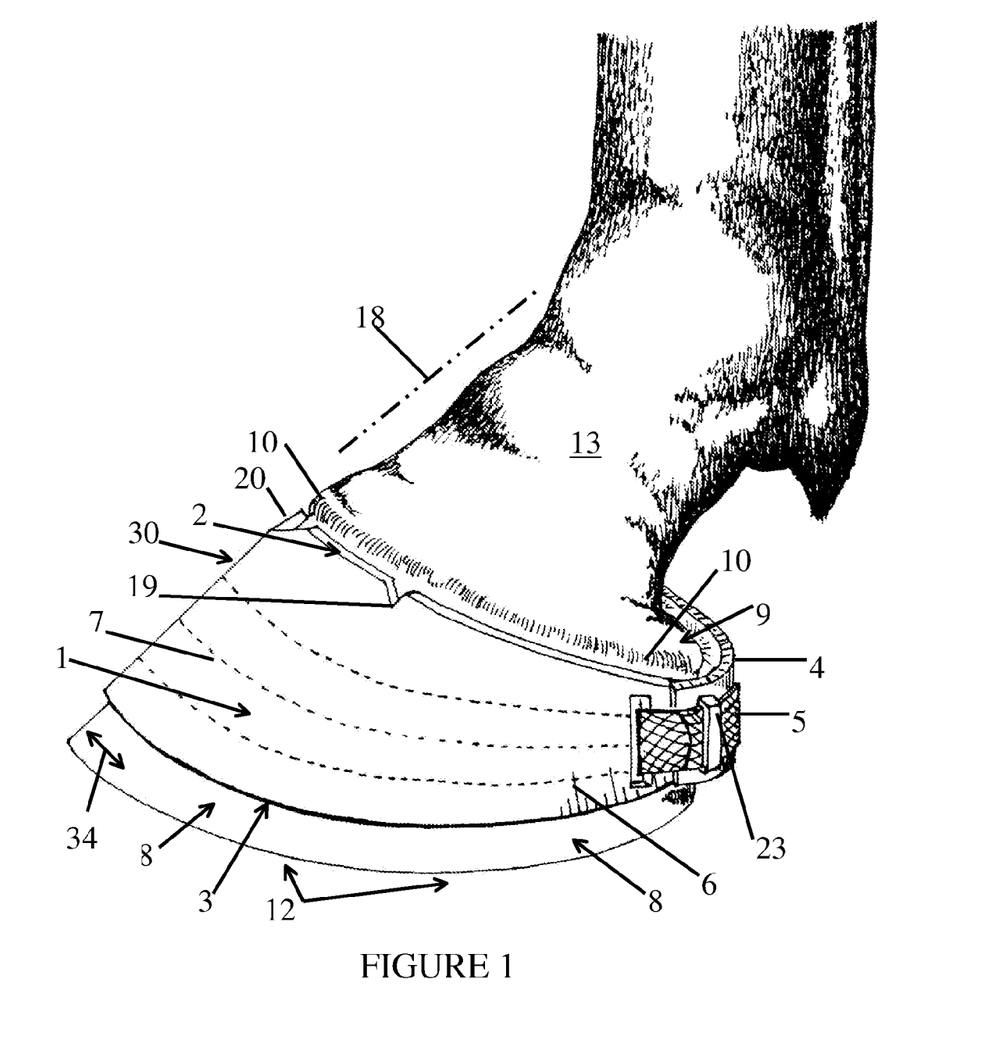
FIG. 1 is a three dimensional schematic drawing showing a lateral view of the normal, balanced equine hoof and pastern with an embodiment of the present invention superimposed there upon.
Figure 5:
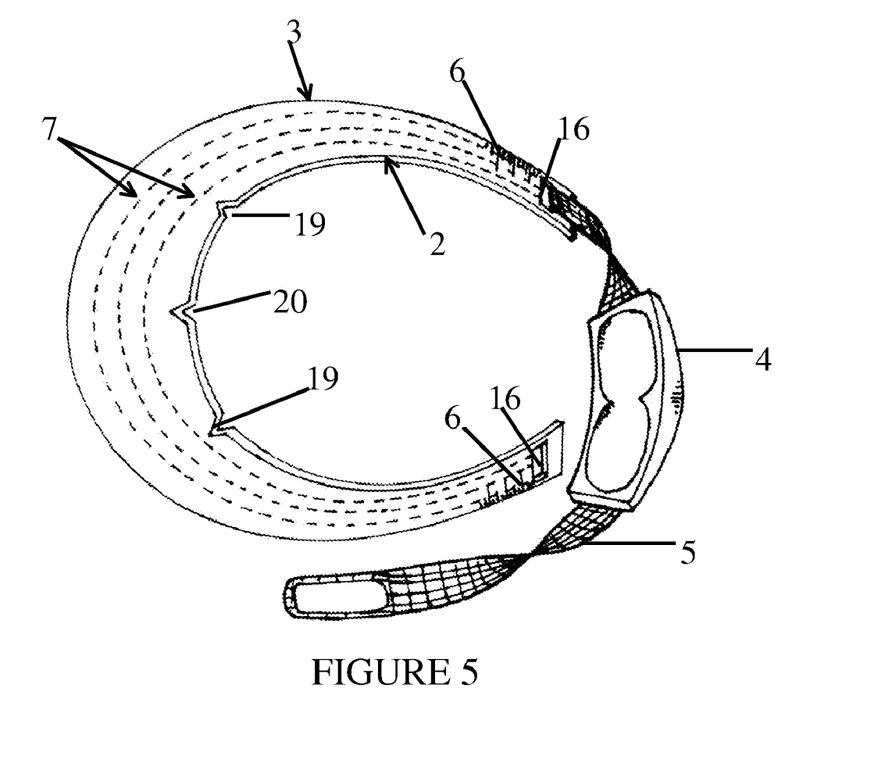
FIG. 5 is a top view of the present invention.
Figure 6:
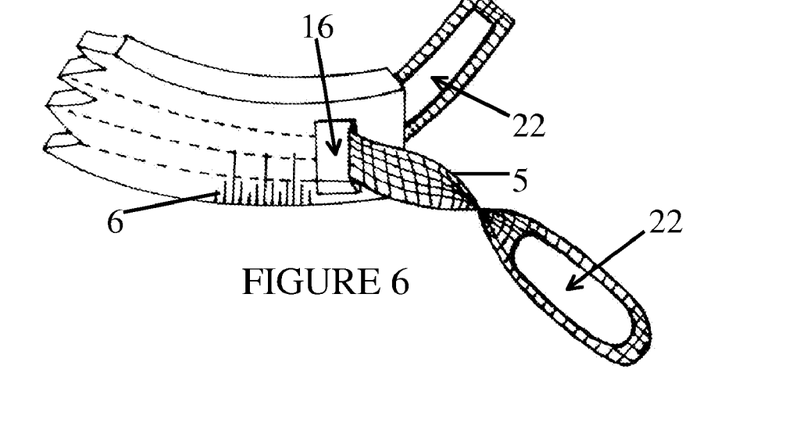
FIG. 6 depicts an embodiment of the fastening system in the posterior portion of the present invention.

Referring now to FIG. 1, there is illustrated a Hoof Balancer and Limb Alignment Tool, 1, according to one embodiment of the present invention. In this embodiment, the Hoof Balancer and Limb Alignment Tool 1 (for simplicity, hereafter referred to as "Tool") is shown superimposed upon a hoof capsule 8, which is all that horny material of the foot extending from the coronet band 10 to the ground. Tool 1 is properly placed with the upper edge 2 of the device parallel and adjacent to the coronet band 10 of the subject hoof. The lower edge 3 of the Tool 1 suggests the proportionate distance from the coronet band 10 that the ground surface 12 of the hoof capsule should be in an ideally balanced hoof capsule. To assure that the middle of the device, illustrated here by indicator number 20, and the center or toe of the foot 34 are consistently matched, reference notches are included on the device to indicate the locations of the medial and lateral pillars 19 of the hoof capsule and the center of the toe 20. Reference lines 6 and 7, which are indelibly inscribed on the invention, are used for making measurements of the length of hoof, the relocation of the invention in its application, and for assessing heel length, slope, and location. These markings, 6 and 7, are best seen in FIGS. 5 and 6. Their use will be discussed at length later in this detailed description of the invention.

Continuing with FIG. 1, Tool 1 may be secured to hoof capsule 8 by an attaching mechanism (see also FIG. 8) that is comprised of a strap 5 made of a webbed, stretchable, or similarly adjustable, material and a pliable cone- or cup-shaped pad 4. The pad 4 is so configured as to fit the bulbs 9 of the equine foot to assure the comfort of the horse. The pad 4 may also stabilize Tool 1 when it is superimposed on the hoof. In this embodiment of the invention, webbed material 5 is affixed to pad 4 by passing the webbed material 5 through loops 23 (see also FIG. 8) located at both ends and on the side of pad 4 opposite to that side which contacts the bulbs of the foot.

Figure 2:
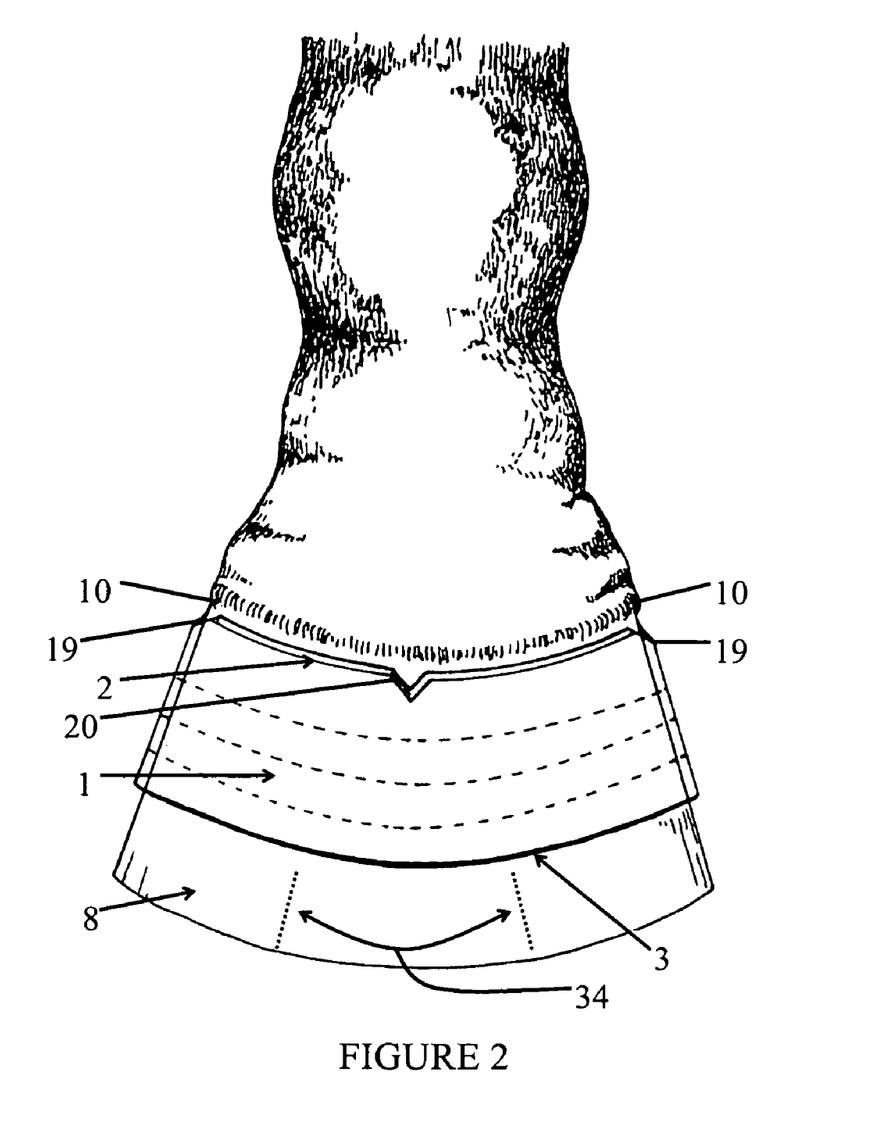
FIG. 2 is a three dimensional schematic drawing showing an anterior-posterior view of the normal, balanced equine hoof and pastern with an embodiment of the present invention superimposed there upon.

FIG. 2 is an anterior-posterior view of one embodiment of the invention. As in FIG. 1, Tool 1 is placed properly with the top edge 2 of the device parallel and adjacent to the coronet band 10. The lower edge 3 of the Tool 1 will be used as a template to create balancing guidelines on the hoof capsule. The balancing guidelines will be discussed at length later in this description. The Pillars of the hoof capsule are indicated by notches at 19 and the toe is indicated by the notch at 20. These three points must be aligned to ensure consistent and symmetrical placement of the Tool. The toe of the hoof 34 is reasonably easily identified as the middle and most prominent portion of the front of the hoof capsule and should be aligned with the mark 20. Once the invention is generally positioned over the toe, the pillars of the hoof become apparent. Using the pillars, the device can then be positioned more precisely over the toe of the hoof.

Figure 3:
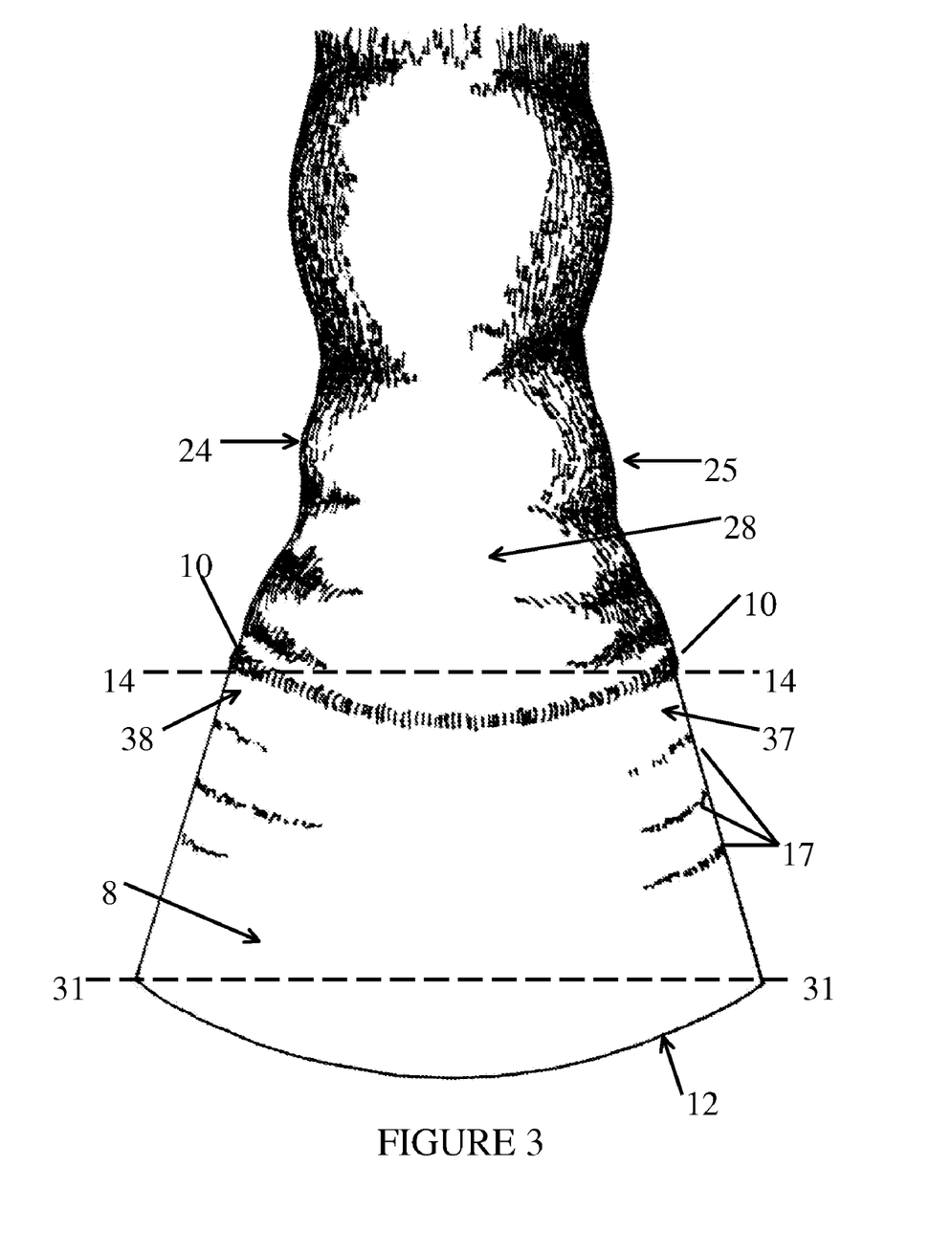
FIG. 3 depicts a balanced equine hoof and pastern in the anterior-posterior view.

In order to understand the true and unique nature of this invention, one must first understand that the normal equine hoof will deform under the influence of uneven concussion across the ground surface of that hoof. This difference is best understood by comparing a normal hoof capsule with a hoof capsule that has been deformed by uneven concussion and shock absorption resulting from an imbalanced hoof capsule. FIG. 3 is a schematic view of the normal hoof as it appears in the anterior-posterior view. As this hoof meets the ground, the concussive forces dissipate evenly from the ground surface 12 throughout the hoof and the hoof capsule remains symmetrical.

Several landmarks confirm that the hoof capsule in FIG. 3 is properly balanced and aligned with the adjoining limb: (1) The curvature of the coronet band 10 and the curvature of the hoof at the ground surface 12 are similar. (2) As indicated by Line 14, which spans the apices of the pillars 37 and 38 of the hoof, the coronet band 10 is horizontal and parallel to a horizontal plane, Line 31. (3) The annular growth rings 17, apparent in the hoof capsule 8, are evenly spaced from the coronet band 10 to the ground surface 12, suggesting that the hoof capsule is growing at the same rate throughout the foot. (4) The pastern 28 is straight, as indicated by the similar lengths of the medial aspect 25 and lateral aspect 24 of the pastern 28. This last landmark is most useful for assessing hoof-to-limb alignment. It must be noted that a straight pastern does not imply that the foot is located "straight in front of the horse" rather that it is aligned with the adjoining limb.

A "straight pastern" is straight because the joint spaces in the pastern joints are even. Viewed with AP roentgenogram, the gap in the joint space is the same from one side to the other. The only way for these joint spaces to be even is for the hoof capsule to be correctly aligned with the pastern. In the absence of radiograph, the only way to know whether the hoof capsule is correctly aligned with the pastern is by assessing hoof capsule deformation. Hoof capsule deformations are caused by problems that will ultimately injure the horse. Clearly, the best time to identify and correct these problems is when the deformation they create in the hoof capsule is subtle and may escape notice.

Given that the balanced hoof capsule always looks like the hoof capsule depicted in FIG. 3, it is reasonable to attempt to make all hoof capsules have this appearance. By using the present invention, which is a duplicate of the ideal hoof capsule, one can draw lines on horse hoof capsules which approximate the lengths of toe, sidewalls, and ground surface necessary for the living hoof to be in perfect balance with its adjoining pastern and leg. The implementation of this important concept will be further elucidated in a later paragraph.

Figure 4:
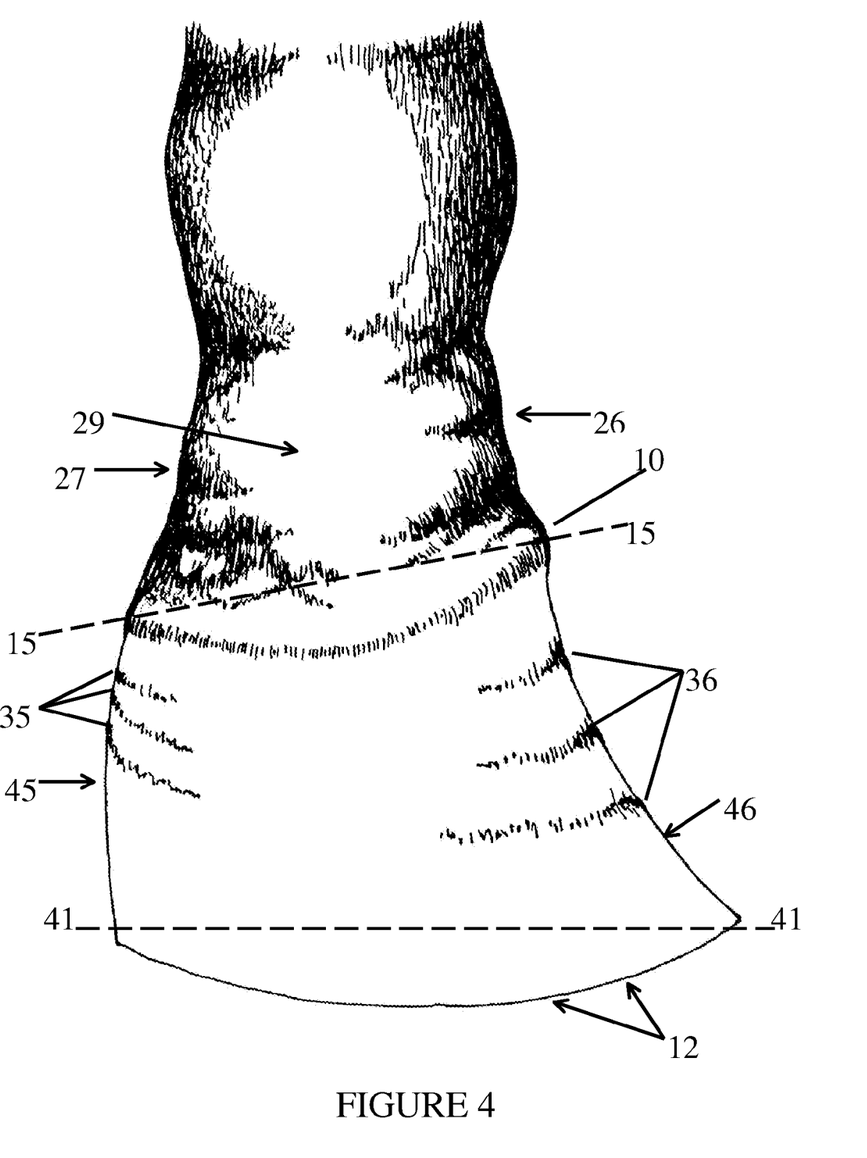
FIG. 4 depicts an unbalanced, deformed equine hoof and resultant misalignment of the adjoining pastern and fetlock in the anterior-posterior view.

FIG. 4 is a schematic view of a deformed hoof capsule with an uneven and skewed growth pattern. The medial aspect 26 of the pastern 29 is shorter than the lateral aspect 27. Given this visible difference in pastern length from medial to lateral side, one can assume that the joint spaces are closer on the medial side than on the lateral side. Joint spaces being naturally even, one can further assume that the situation here described is the result of bony column misalignment, which can only be caused by hoof capsule misalignment with the adjoining limb. Further indicating hoof capsule and limb misalignment, the annular growth rings 36 on the medial aspect of this hoof capsule are widely spaced, while the growth rings are narrowly spaced 35 on the lateral side. The deviated pastern 29 suggests a medial-lateral imbalance of the hoof capsule. The dissimilar annular growth rings 35 and 36 suggest an uneven distribution of the concussive forces across the foot and an uneven growth rate within the hoof. The side of the foot displaying wider spacing 36 of the annular growth rings is receiving less concussion and compressional force than the opposite side with the narrower spacing between the growth rings 35, suggesting that that side of the hoof is growing faster than the side with increased concussion.

The cause of the variations in compressional forces in the hoof capsule depicted in FIG. 4 can be found in one or both of two places: first, the relative difference in length of medial hoof wall as compared to the lateral hoof wall; and/or second, a deviation of adjoining limb. The former is likely manmade, the latter is more likely caused by a skeletal defect of the horse. In both cases, manmade imbalance and genetic aberration in the limb, the resulting deformation of the hoof capsule is the same. The present invention addresses both problems without prejudice.

Referring still to FIG. 4, in order to fully understanding the application and function of the present invention, one must explain how the uneven distribution of concussion through the equine hoof causes the deformations here depicted. Note that a perfectly symmetrical hoof capsule may be considered imbalanced if the adjoining limb is not vertically situated over the capsule. Such a situation, which is common in horses, creates a relative imbalance in the hoof capsule. Assuming that the adjoining leg in FIG. 4 is wide at the base and the horse has a narrow chest, the foot here depicted would naturally occur. This hoof capsule would also appear as here depicted if it were man-created by improper trim.

Because the medial side of the hoof capsule depicted in FIG. 4 is relatively longer than the lateral side, the medial side contacts the ground slightly before the lateral side. This slight difference in timing sends a greater concussive force to the relatively shorter side. Increased concussion on the shorter side causes the collapse and compression of the shorter side of the hoof capsule. Conversely, the longer side, suffering less compressional force, lengthens. As the medial wall lengthens from reduced compressional force and the medial annular growth rings 36 expand, the coronet band 10 is pushed cranially on that side. As depicted in FIG. 4, the coronet band 10 is notably tilted out of parallel from the horizontal plane 41 of the ground surface 12 as indicated by Line 15. Further, the length of the medial aspect 46 of the hoof in FIG. 4 is concave and visibly longer than that of the lateral aspect 45, which is convex in shape. Without intervention, this unbalanced loading of the hoof capsule becomes a worsening cycle.

Clinically, hoof capsule deformation is difficult to see until it reaches the extreme condition depicted in FIG. 4. The condition need not be extreme to be harmful to the horse. The present invention, being a model of a balanced hoof capsule, identifies the subtle impact induced changes in medial and lateral wall lengths. Having identified these subtle changes, the farrier can make corrections necessary to prevent the deformation of the hoof capsule and injury to the horse.

Figure 7:
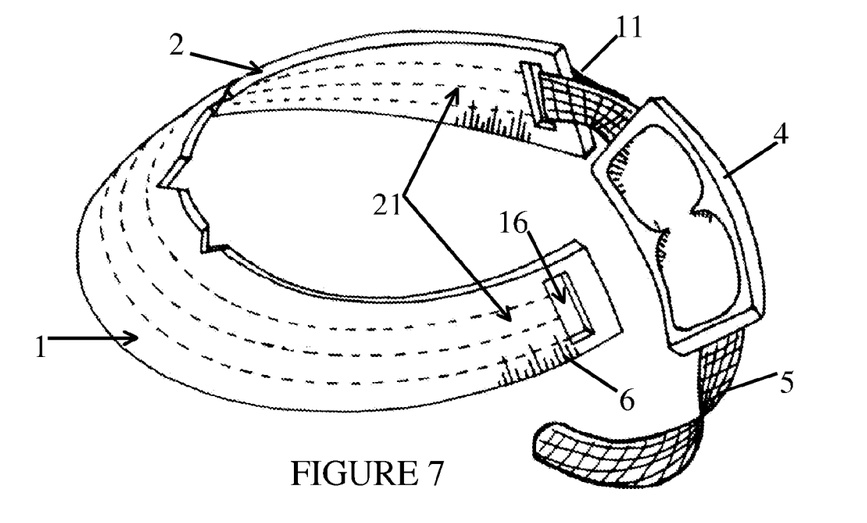
FIG. 7 is a three-dimensional schematic of an embodiment of the present invention.

FIGS. 5 and 7 show freestanding views of an embodiment of the present invention. FIG. 5 is a top view showing generally the shape and proportion of the invention. The upper edge 2 of the device is shown with the locations of the pillars 19 and the center 20 of the device which correspond to the center of the toe of the hoof capsule. Lower edge 3 is of a larger circumference than the upper edge 2 as might be expected of a normally growing, balanced equine hoof. The removable, adjustable attaching mechanism comprised of pad 4 and strap 5 is shown with the mechanism attached to one branch of the device at slot 16. It is evident from the views presented by FIG. 5 and FIG. 7 that the shape and contact circumference of the device can be modified by tightening or loosening the attaching mechanism thereby accommodating feet of different sizes and shapes.

In this embodiment of the present invention, the webbed material 5 is threaded through slot 16 located in the medial and lateral posterior branches 21, FIG. 7, of the Tool 1. The strap 5 folds onto itself and using the integrated hook-and-latch material 22 (FIG. 8) forms an attaching loop 11 (FIG. 7). As shown, "hook-and-latch" material 22 (FIG. 6) is affixed to the ends of the webbed strapping material 5 for securing the attaching mechanism to the Tool 1 and the Tool 1 to the hoof capsule. Rivets, glue, stitching, or other suitable method of attachment might also be used to affix webbed material 5 to pad 4. All manners of attachment of pad 4 to the webbed material 5 and of the webbed material 5 to the Tool 1 allow for variable placement of pad 4 (FIGS. 5, 7, and 8) assuring a best and most comfortable fit of the device. The adjustable attachment of strap 5 to tool 1 also provides a means for attaching the invention to a variety of sizes and shapes of hoof capsules. Other, similarly adjustable latching systems might be utilized.

Figure 8:
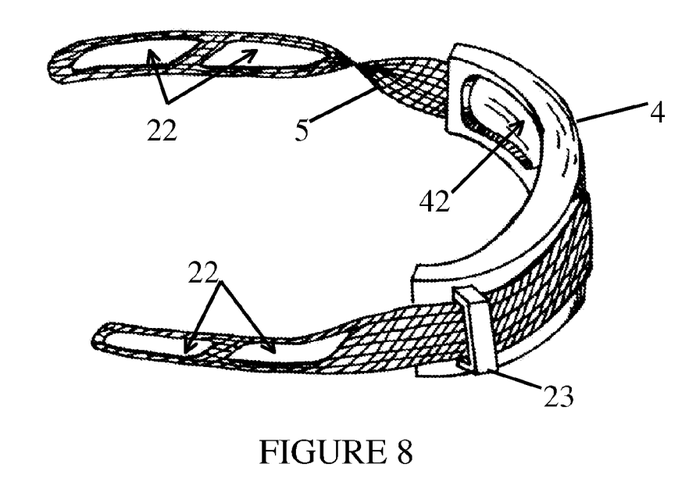
FIG. 8 depicts an embodiment of the bulb protection pad and attaching system.

FIG. 8 is a stylized depiction of pad 4 and strap 5. The front surface of pad 4 is a simple plane with cup-shaped depressions 42 which conform to the fleshy bulbar posterior portions of the foot, the bulbs of the foot. Pad 4 provides protection against the binding pressure of attaching strap 5 and a secure, stabilized surface across which attaching strap 5 may pass. This attaching system is intended to prevent strap 5 from slipping upward or downward as is traverses the curvilinear surface of the bulbs of the foot. Combined with the attaching strap 5, pad 4 stabilizes and secures the invention on the foot (See also FIG. 1.).

Figure 9:
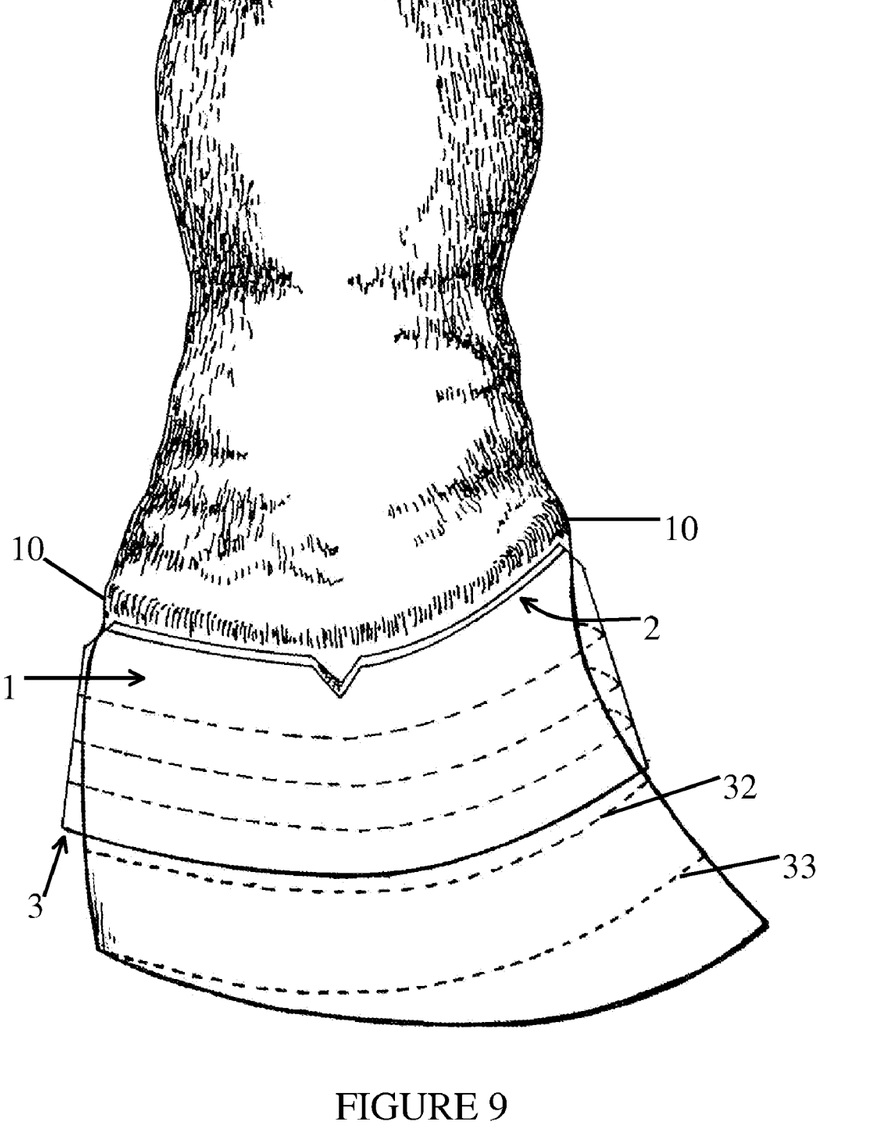
FIG. 9 is a schematic drawing showing an anterior-posterior view of an embodiment of the invention being used to make guidelines on the hoof capsule.
Figure 10:
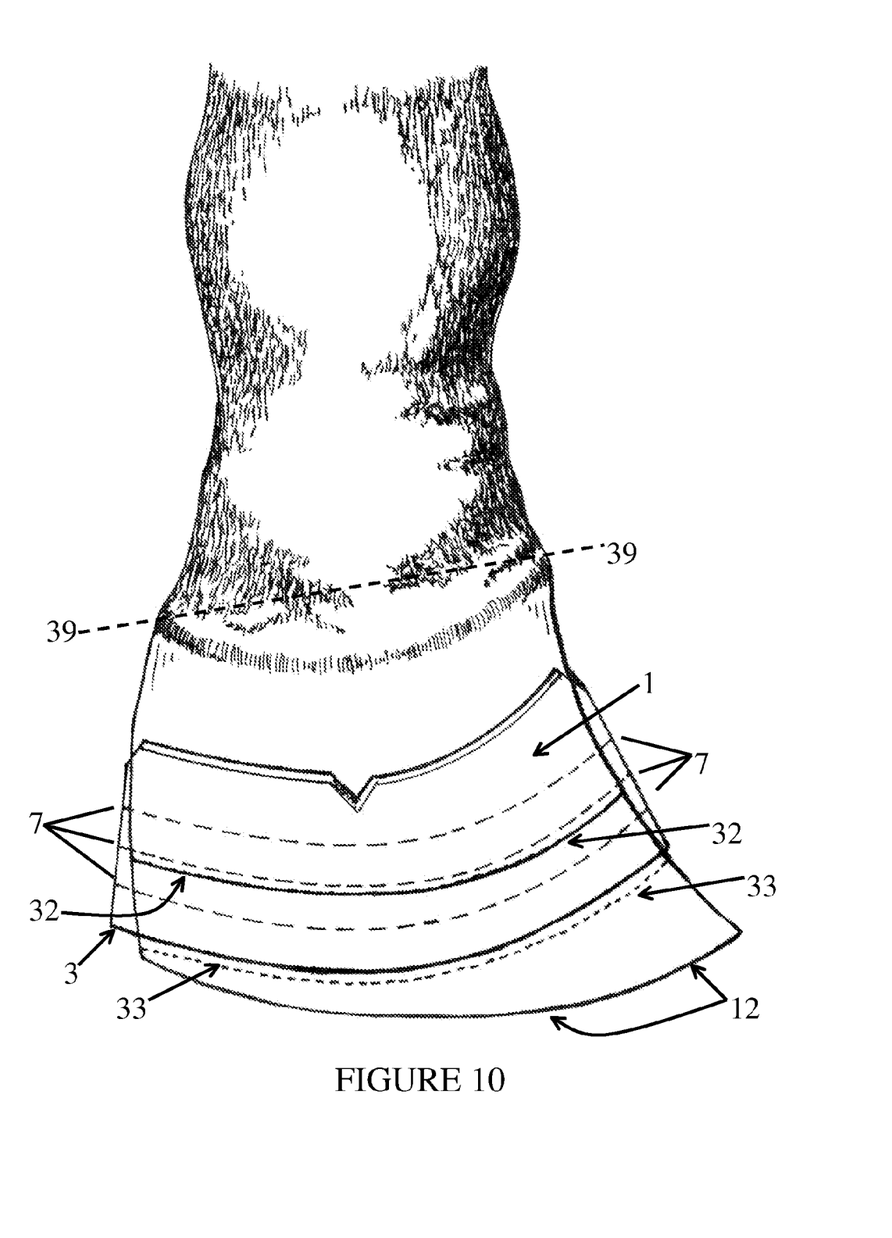
FIG. 10 is a schematic drawing showing an anterior-posterior view of an embodiment of the invention being used to make additional guidelines on the hoof capsule which can be utilized to more accurately visualize the presence, or lack thereof, of balance in the subject hoof capsule as well as establish lengths of hoof wall from coronet band to ground surface.

The invention is applied in the field as shown in FIG. 9. It has been previously suggested that the hoof capsule deforms predictably and most quickly at the coronet band 10. Being constructed of a flexible and resilient material the Tool 1 deflects into the deformities of the coronet band 10, FIG. 9. By matching the upper edge 2 of the Tool 1 to the coronet band 10 and positioning the device precisely above the center of the toe and over the pillars, a line 32 may be traced along the lower edge 3 of the invention and around the circumference of the hoof capsule. Then by repositioning the device as indicated in FIG. 10 by aligning the appropriate horizontal index mark 7, adjacent and parallel to line 32, a new line 33 is drawn along the lower edge 3 of Tool 1. This line 33 should be as close to the ground surface as possible and still permit the majority of the hoof capsule to be circumscribed by the line 33. The hoof wall remaining between this line 33 and the ground surface 12 is the material that must be removed in order to bring the hoof capsule into balance.

This new line 33, FIG. 10, is not a "cut" line. It is a guideline which has been drawn near the ground surface of the hoof capsule in order that those portions of the hoof that are too long or short might be better visualized. By fitting Tool 1 into the deformed coronet band and inscribing lines 32 and 33, as traced along the lower edge 3 of Tool 1, a correction can be made that will allow the hoof capsule to "settle" back to its correct, natural configuration. Once trimmed relative to the guideline 33, that portion of the hoof capsule that is compressed will be relieved. As indicated by the upward slope of line 39, the coronet band is excessively pushed upward by the hoof wall that is less compressed and growing more rapidly. That side of the hoof will be more aggressively trimmed than the other side, which has not been pushed upward but in fact compressed.

Figure 11:
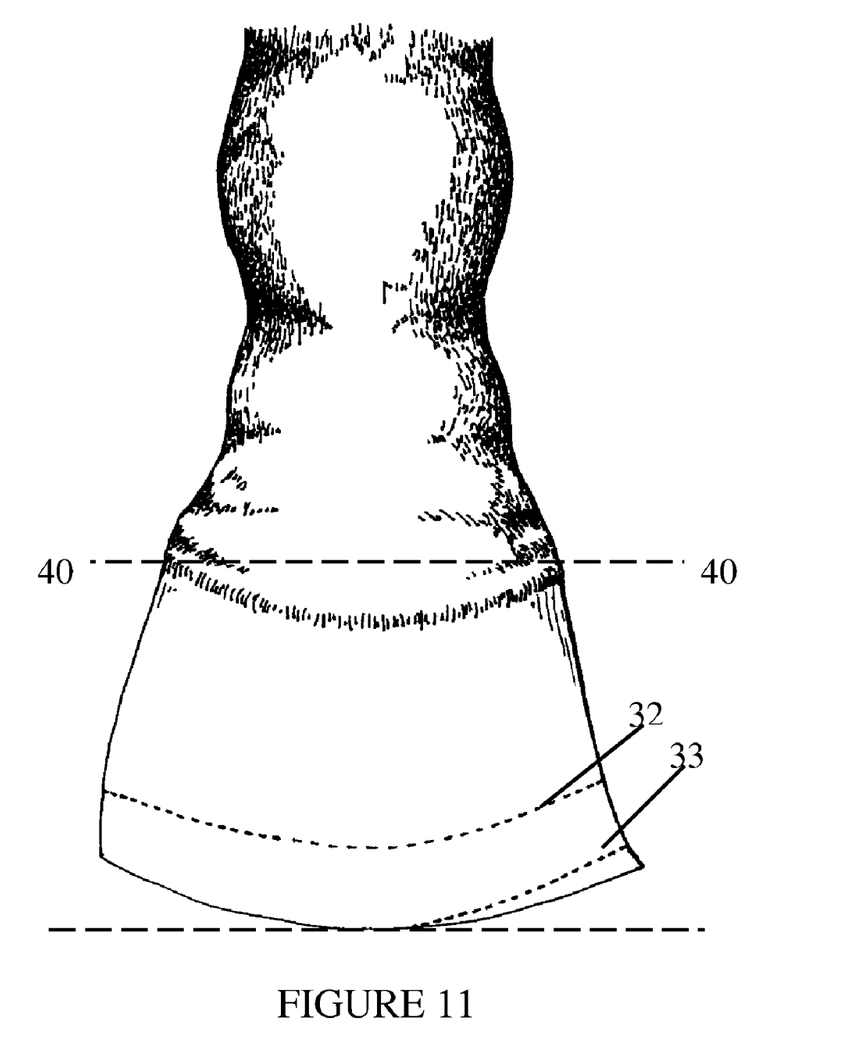
FIG. 11 is a three dimensional schematic view of the deformed hoof capsule after the inventive system and method of correction have been utilized to execute a trim.

The impact of this correction is evident in the comparatively horizontal coronet band 10 in FIG. 11. This reconfiguration of the coronet band 10 is demonstrated by line 40. Note that line 40 is far closer to horizontal, relative to a horizontal plane, than line 39 in FIG. 10, even although removal of all the hoof necessary to achieve complete balance was impossible at the time the correction was made.

A common practice in the assessment of hoof capsules is the measurement of the angle of slope of the dorsal wall. Such measurement has typically been made utilizing a "hoof protractor." Indeed, there is much clinical evidence suggesting that within the horse population the "normal" hoof may range from nearly vertical to nearly horizontal when considered from a side view. In the correctly worn or trimmed hoof, the angle of the hoof capsule imitates the slope of the bony column of the pastern. Note that a line 18, FIG. 1, approximating the slope of the pastern 13 closely approximates the line 30 described by the anterior apex of the toe of the balanced hoof capsule and Tool 1. The horse's physiology is so designed as to accommodate some variation in hoof angle with little detriment to the horse, so long as the angle remains within a reasonably close range of the correct angle. That range might be ±3 degrees of proper angle.

To be truly useful, the present invention must work with all sizes, shapes, and angles (conformations) of hoof capsules. Therefore, several dimensional variations of the invention are envisioned, none of which changes the form or function of the preferred embodiment. Each variation is intended to be used for a given range of angle of pastern axis and, by extension, hoof capsule. In this way, the present invention may accommodate hoof capsules that are either more or less steep as dictated by the conformation of the adjoining limb. The creation of several embodiments of the present invention at differing angulations and in different sizes assures the selection of an appropriately angled and sized embodiment of the device for the hoof capsule being assessed.

A further characteristic of the present invention is that, having once selected the size and angulation range which are appropriate to the animal being assessed and properly superimposing the device onto the hoof capsule, the ideal length of toe and heel needed to correct the anterior-posterior balance and alignment of the hoof are divulged.

Figure 12:
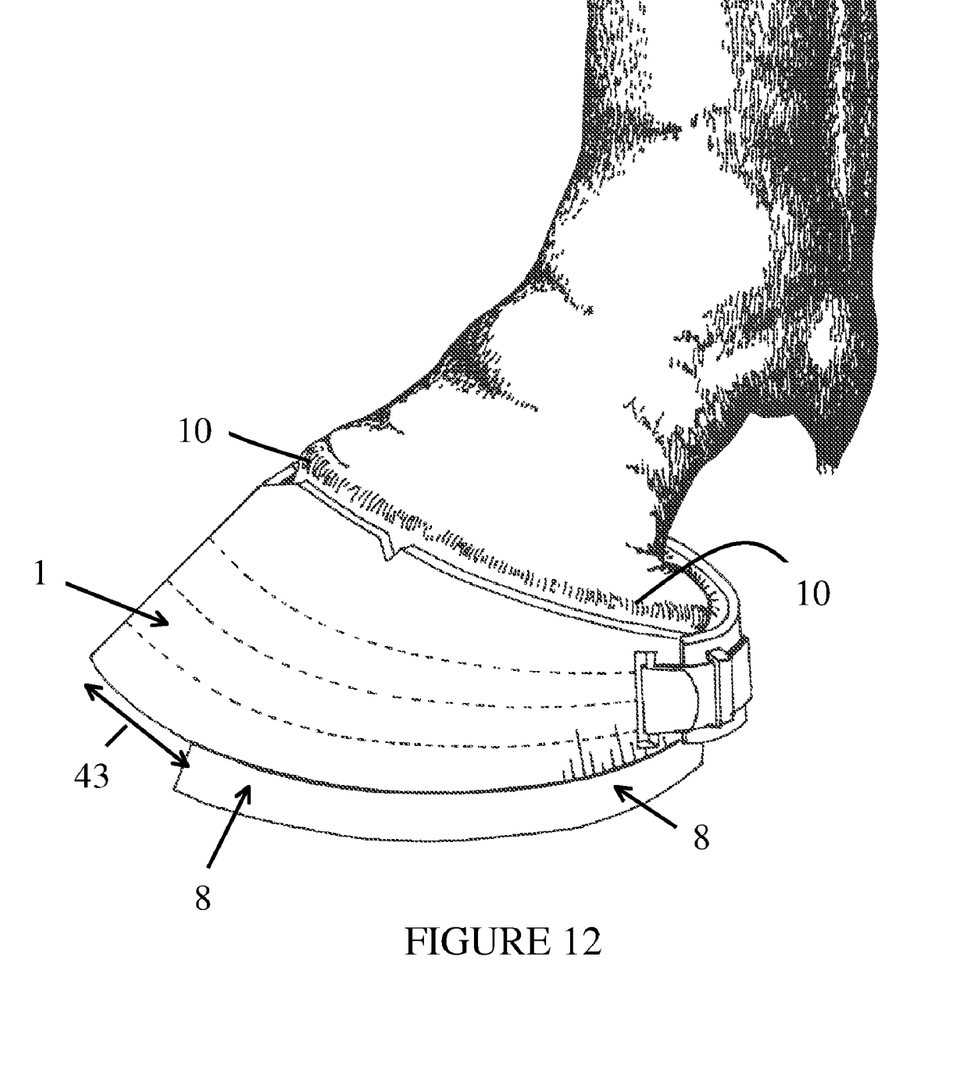
FIG. 12 is a side view of the preferred embodiment of the present invention superimposed upon an upright hoof capsule.

One first appropriately selects the proper embodiment of the invention based on the horse's pastern axis. In this example, the assumption is that the hoof capsule is excessively upright. When superimposed onto a hoof capsule 8, FIG. 12, that is too upright, the device will not fit snugly at the distal portion of the dorsal wall as indicated by the gap 43 between Tool 1 and the dorsal wall of the hoof, FIG. 12. Conversely, should Tool 1 be fitted snugly to the dorsal wall, the upper edge of the device can no longer parallel the coronet band 10. This suggests that the hoof capsule is too long at the heel, too short at the toe, or some combination of the two. To correct this problem, the excess heel must be removed and/or the toe must be allowed to lengthen.

Figure 13:
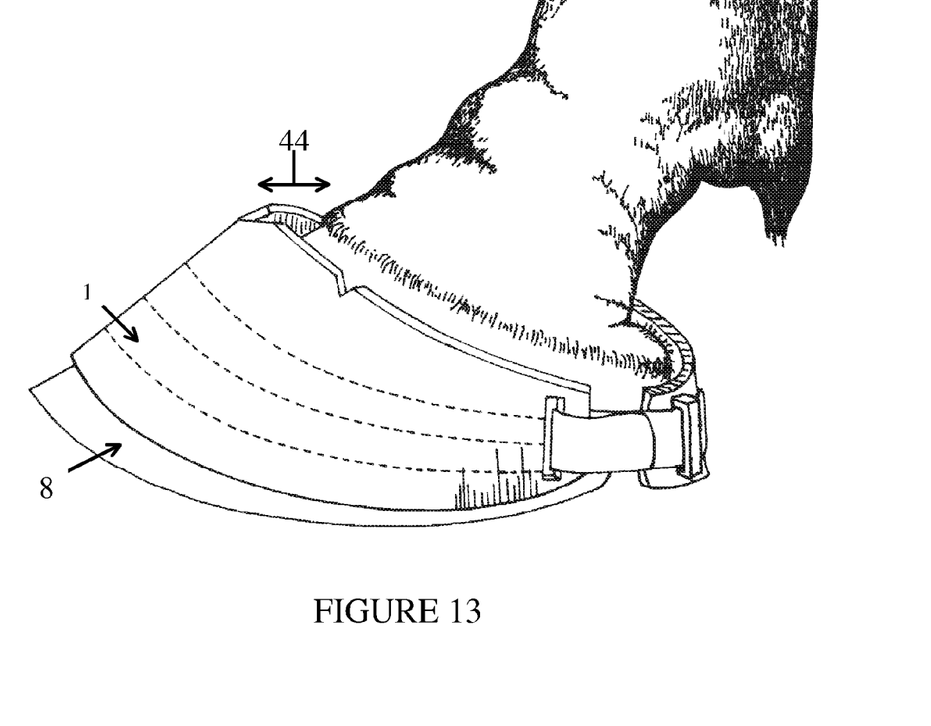
FIG. 13 is a side view of an embodiment of the present invention superimposed upon a hoof displaying excessive rearward slope

A hoof capsule that is too long will fit snugly at the distal end of Tool 1, FIG. 13, but not contact the hoof capsule 8 along the gap 44 at the coronet band. This suggests that the toe is too long, the heel too short, or a combination of the two. This hoof capsule is corrected by removing excess toe and solidifying, but leaving intact, the heels as indicated by the Tool 1.

The present invention is intended to find inconsistencies in the relative lengths of the various arcs of circumference of the hoof capsule and not the "ideal" length. There can be no ideal length because each hoof capsule varies as to the location of the sensitive tissue within the horny sole and hoof wall.

The present invention brings the hoof capsule into balance by using the coronet band as the "starting point." This method presumes (1) that hoof capsule deformations are caused by unequal compressional pressures acting on the hoof capsule, (2) that hoof capsule deformations are predictable and caused by identifiable inconsistencies in the hoof wall lengths and growth patterns, and (3) that the only way to rebalance and align the hoof and limb is to relieve the unequal compressional pressures acting on the hoof capsule. A reliable way to maintain balance of, or to rebalance and align, the equine hoof and limb is to recognize that the coronet band of the equine foot responds rapidly and predictably to these uneven compressional pressures. If one uses the coronet band as the start point for assessing balance, incipient problems may be rectified or avoided. Coronary deformations are difficult to visualize and therefore difficult to correct. The invention herein described helps the horse owner and equine technician visualize correct hoof balance and configuration. In this way, one can restore the deformed hoof capsule to the normal dimensions indicated by the present invention thereby rebalancing the hoof capsule. Over time, successful rebalancing of the unbalanced hoof capsule results in the remodeling of the deformed capsule to a more symmetrical and normal conformation and reduces equine lameness.

While particular embodiments of the present invention have been illustrated and described, it will be obvious to those skilled in the art that various other changes and modifications can be made without departing from the spirit and scope of the invention. It is therefore intended to cover in the appended claims all such changes and modifications that are within the scope of this invention.

The invention claimed is:

1. A measuring and assessing device for use in bringing an equine hoof into correct position and balance relative to an adjoining pastern and upper limb, said device being directly applied to an equine hoof wall, parallel to a coronet band, in the manner of a template or pattern, said device comprising:
   (a) a flexible, malleable, and resilient material more or less ovate in shape being continuous and rounded at one end and open and discontinuous at the opposite end, and having a first side and an opposing second side, an upper edge and an opposing lower edge, a medial aspect, a lateral aspect, an anterior aspect which is the continuous, rounded end, and a posterior aspect which is the opposing open end;
   (b) a set of markings and measurement indices which are indelibly inscribed on the anterior, medial, lateral, and posterior aspects of the device and which describe dimensions and locations of anatomical structures affecting the balance and alignment of said hoof,
   (c) an attaching system located in the area of said open ended, posterior portion of the device, which joins the terminal portions of the medial and lateral aspects of the device by which the said resilience of said flexible and resilient material may be reinforced thereby providing a means of temporarily affixing said device to the equine hoof.

2. The device as recited in claim 1, wherein the first side is in contact with the equine hoof, the material being of sufficient flexibility so that it may be expanded to fit around said equine hoof, malleability to parallel and follow the line of the coronet band, and resilience to bring said first side of the device into contact with a hoof capsule.

3. The device as recited in claim 1, wherein said medial and lateral aspects are interchangeable and the device is equally appropriate for use with either a near limb or an off limb.

4. The device as recited in claim 1, wherein
   (a) the upper edge of the device is so shaped and designed as to imitate the complexity of angles and circumference of the coronet band when said hoof is correctly positioned relative to the adjoining pastern and upper limb, with markings to indicate pillars and middle point of hoof at the coronet band, and serves as a locating mechanism for attaching and utilizing the device;
   (b) the lower edge is so shaped and designed as to imitate the complexity of angles and circumference of an equine hoof ground surface when said hoof is correctly positioned relative to the adjoining pastern and upper limb, thereby providing a template or pattern for tracing a continuous line from lateral heel to medial heel of said equine hoof which serves as a guide for the removal of horny material from the ground surface of said hoof during a trimming process and as a tool for the assessment of the growth of the equine hoof and the correctness of said trimming process.

5. A tool for measuring a hoof attached to an adjoining pastern and upper limb; the hoof including a ground surface, a toe, an upper edge, a medial pillar, and a lateral pillar; the upper edge of the hoof defined by a coronet band; the ground surface of the hoof and the coronet band having balanced configurations when the hoof is correctly positioned relative to the adjoining pastern and upper limb, the balanced configurations including a hoof angle between the ground surface and the hoof at an anterior apex of the toe, the tool comprising:
   flexible material configured to wrap around the hoof, the flexible material including an upper edge and an opposing lower edge, a first side and an opposing second side, the first side of the tool for contacting the hoof;
   the upper edge of the tool having a configuration that imitates the balanced configuration of the coronet band when the hoof is correctly positioned relative to the adjoining pastern and upper limb; and
   the lower edge of the tool having a configuration that imitates the balanced configuration of the ground surface of the hoof when the hoof is correctly positioned relative to the adjoining pastern and upper limb.

6. The tool of claim 5, wherein the upper edge includes a marking to indicate the toe of the hoof.

7. The tool of claim 6, wherein the upper edge further includes a marking to indicate the medial pillar of the hoof and a marking to indicate the lateral pillar of the hoof.

8. The tool of claim 6, wherein the lower edge lies substantially in a single plane and an angle between the single plane and the second side of the tool, at the marking that indicates the toe of the hoof, is approximately a same angle as the hoof angle between the ground surface and the hoof at the anterior apex of the toe in the balanced configurations.

9. The tool of claim 5, wherein the flexible material is substantially transparent.

10. The tool of claim 5, further comprising an attaching mechanism for temporarily fixing the tool to the hoof.

11. The tool of claim 5, wherein the lower edge has a larger circumference than the upper edge.

12. The tool of claim 5, wherein the second side includes markings to indicate at least one line that is substantially parallel to the lower edge of the tool.

13. A method of measuring a hoof of an animal, comprising:
   providing the tool of claim 5;
   placing the upper edge of the tool adjacent and parallel to the coronet band;
   aligning the tool by aligning a middle point of the upper edge of the tool with a toe of the hoof; and
   marking the hoof along the lower edge of the tool.

14. The method of claim 13, wherein aligning the tool includes aligning medial and lateral pillar markings on the upper edge of the tool with the medial and lateral pillars of the hoof.

15. The method of claim 13, further comprising, after marking the hoof along the lower edge of the tool, moving the tool downwardly on the hoof so that markings on the tool that are substantially parallel to the lower edge of the tool are aligned with markings made on the hoof in the marking step, and then, marking the hoof again along the lower edge of the tool.

16. The method of claim 15, further comprising repeating claim 15 until the hoof is marked along the lower edge of the tool with the lower edge of the tool as close to a ground surface as possible, and the lower edge of the tool circumscribes a majority of the hoof.

17. A tool for measuring a hoof attached to an adjoining pastern and upper limb; the hoof including a ground surface, a toe, an upper edge, a medial pillar, and a lateral pillar; the upper edge of the hoof defined by a coronet band; the tool comprising:
   flexible material configured to wrap around the hoof, the flexible material including an upper edge and an opposing lower edge, a first side and an opposing second side, the first side of the tool for contacting the hoof, the second side of the tool including markings to indicate at least one line that is substantially parallel to the lower edge of the tool;

the upper edge of the tool including markings to indicate the toe, the medial pillar, and the lateral pillar of the hoof; and the lower edge of the tool having a larger circumference than the upper edge and lying substantially in a single plane wherein an angle between the single plane and the second side of the tool, at the marking that indicates the toe of the hoof, is approximately a same angle as a hoof angle between the ground surface and a balanced hoof at the anterior apex of the toe of the balanced hoof.

18. The tool of claim 17, wherein the flexible material is substantially transparent.

19. The tool of claim 17, further comprising an attaching mechanism for temporarily fixing the tool to the hoof.

* * * * *